Feb. 20, 1940.  G. L. CARDINAL  2,191,424
HYDRAULIC WATER LIFT
Filed Sept. 20, 1938   2 Sheets-Sheet 1

Inventor
G. L. Cardinal.
By Lacey & Lacey, Attorneys

Feb. 20, 1940. G. L. CARDINAL 2,191,424
HYDRAULIC WATER LIFT
Filed Sept. 20, 1938 2 Sheets-Sheet 2

Inventor
G. L. Cardinal.
By Lacy & Lacy,
Attorneys

UNITED STATES PATENT OFFICE 2,191,424

HYDRAULIC WATER LIFT

Gerald L. Cardinal, Floydada, Tex., assignor of one-half to John R. Hinton, Floydada, Tex.

Application September 20, 1938, Serial No. 230,879

1 Claim. (Cl. 103—261)

This invention relates to a hydraulic water lift, and it is one object of the invention to provide a device of this character of such construction that water may be caused to flow upwardly through a discharge pipe from a river or other body of water and out through the upper end of the pipe into an irrigation ditch.

It is another object of the invention to provide a device of this character including a vertically disposed discharge pipe and means for ejecting streams of water upwardly through the same below the level of the river or lake and thus cause water entering the pipe through the lower end thereof to be urged upwardly through the pipe so that it will flow from the outlet at the upper end thereof into the irrigation ditch.

It is another object of the invention to provide an apparatus of this character wherein the water which is discharged upwardly through the outlet pipe is drawn from a water tank or reservoir so located that as water flows from the outlet pipe a portion of this water will flow into the tank and thus at all times maintain an ample supply of water in the tank.

It is another object of the invention to provide an apparatus of this character wherein the discharge pipe consists of a plurality of pipe sections connected by couplings of such interior formation that they cooperate with nozzles located therein to cause the water to be moved upwardly through the pipe.

Another object of the invention is to provide an apparatus of this character which is simple in construction, easy to install and inexpensive to operate.

Figure 1:
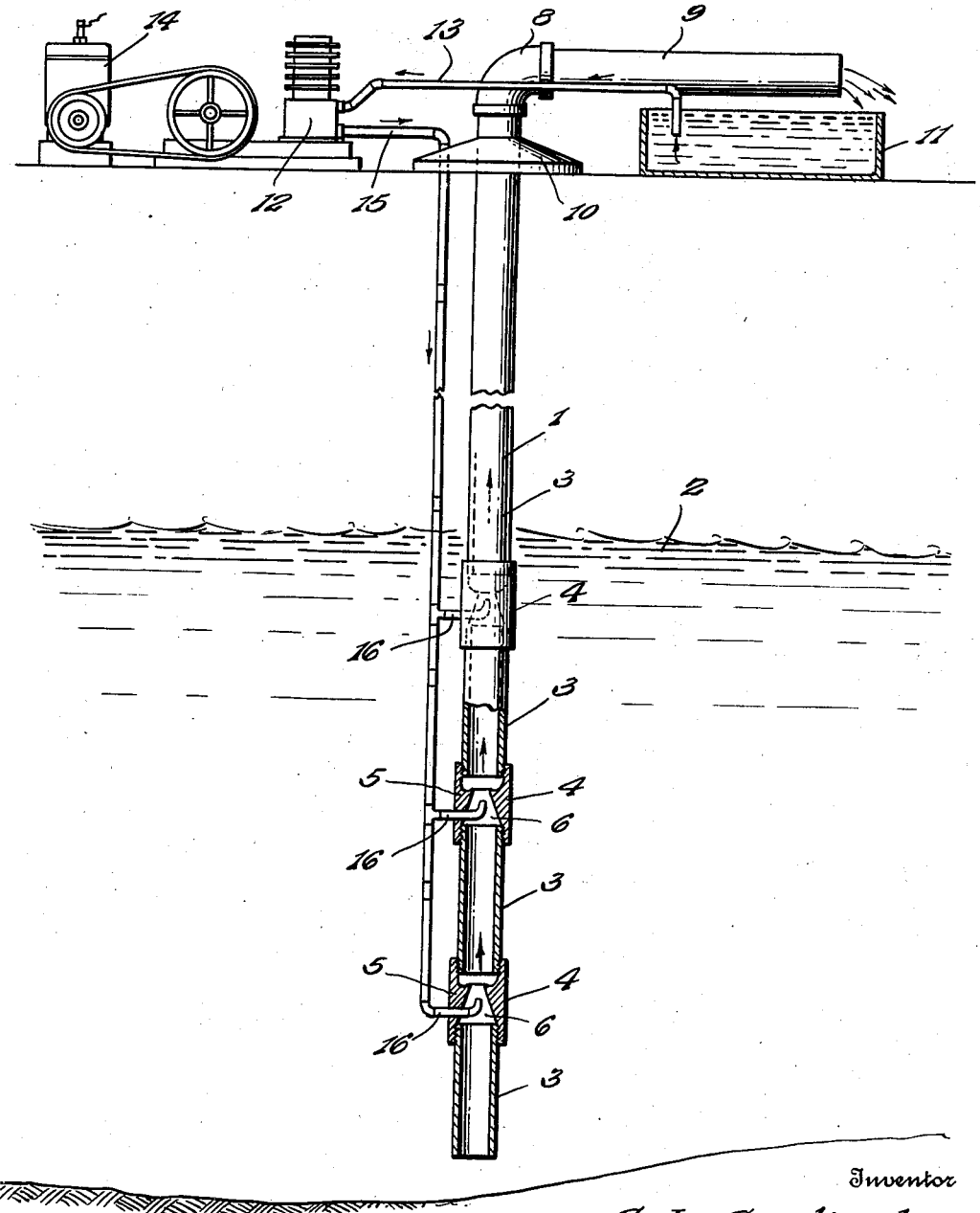
Figure 2:
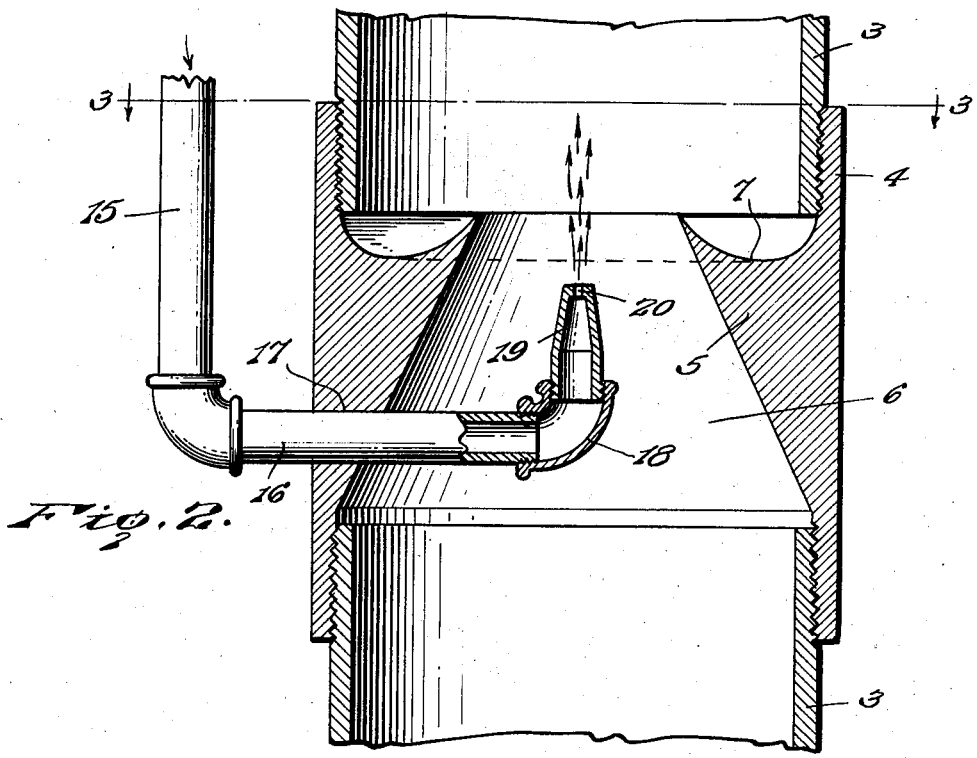
Figure 3:
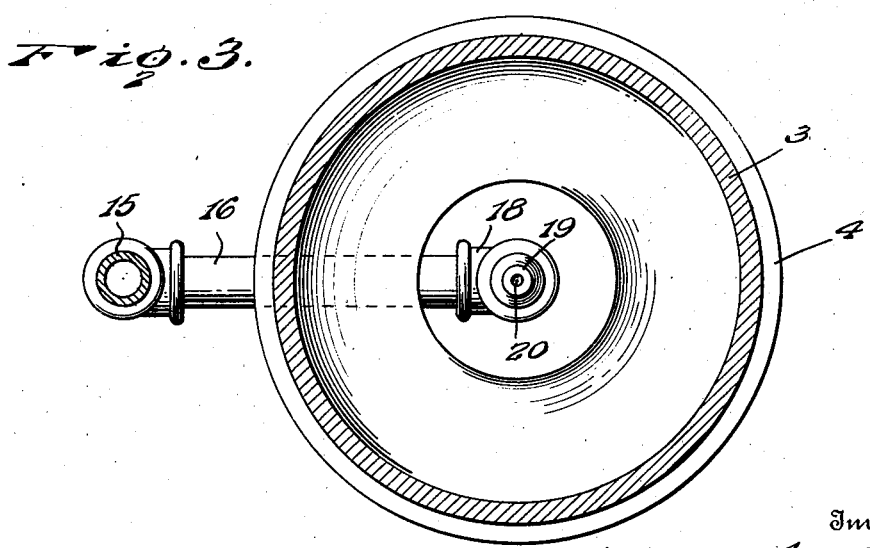

The invention is illustrated in the accompanying drawings, wherein:

Figure 1 is a view partially in elevation and partially in section and showing the improved hydraulic water lift in position for use, Figure 2 is a fragmentary view upon an enlarged scale showing a portion of the outlet pipe in vertical section and one of the nozzles for discharging a jet of water upwardly therein, and Figure 3 is a sectional view taken transversely through Figure 2 upon the line 3—3.

This improved hydraulic water lift is intended for use as means for lifting water from a river, lake, well or other source of supply and delivering the same into an irrigation ditch. The pipe line or discharge pipe 1 through which the water flows from the body of water 2 is disposed vertically with its lower portion immersed in the water and having its lower end open and terminating near the bottom of the well or river or at any other predetermined depth below the surface of the water. This pipe line consists of a plurality of pipe sections 3 which may be any number desired, and these pipe sections are connected by couplings 4 having threaded engagement with the pipe sections, as clearly shown in Figure 2. Referring to this figure, it will be seen that each of the couplings has its walls internally thickened, as shown at 5, to provide a restricted throat 6 which tapers upwardly and at its upper end is surrounded by a shoulder 7 defining an annular trough having a transversely arcuate bottom. It will thus be seen that any water which attempts to flow downwardly through the pipe line will upon striking the concaved shoulder 7 be directed towards the center of the pipe line at an upward angle and urged upwardly. At its upper end the pipe line has an elbow 8 applied thereto, and to this elbow is applied a pipe section 9, from which the water will flow and into an irrigation ditch. A collar 10 surrounds the pipe line below the elbow 8, and since this collar is firmly secured to the pipe by welding or any other desired manner it may rest upon the ground about a well or upon any other suitable support and serve to suspend the pipe line in a vertical position with its open lower end above the bottom of the well or river.

A portion of the water discharged from the pipe section 9 flows into a tank or other container 11 to maintain this tank full of water, and water is withdrawn from this tank by a pump 12 through a pipe 13 having one end extending downwardly into the tank and its other end connected with the inlet of the pump. This pump is of a conventional construction and is driven by a motor 14. The outlet pipe 15 of the pump extends downwardly through the collar 10 in spaced and substantially parallel relation to the pipe line 1 and is provided with branch pipes 16 which pass through openings 17 formed in the couplings 4. The branch pipes 16 are of such length that they terminate adjacent the vertical center or axis of the pipe line and each is located near the lower end of the throat 6 of the couplings into which it extends. An upwardly directed elbow 18 is threaded upon the inner end of each branch pipe and carries an upwardly extending nozzle 19 which tapers upwardly and at its upper end is formed with a small outlet opening 20. The pipes 13 and 15 are of small diameter and the water which is drawn from the tank 11 will be forced through the pipe 15 under heavy pressure and discharged from the nozzles 19 in the form of jets which are directed upwardly through the restricted upper ends of the throats 6. These upwardly directed jets of water urge the water within the pipe line upwardly, and as the water is carried upwardly a suction will be created in the pipe line. It will thus be seen that a column of water will move upwardly through the pipe line and out through the pipe section 9 from which it will flow into the irrigating ditch. As previously explained, a portion of this water will flow into the tank 11 and keep the tank filled with water. Therefore, there will always be an ample supply of water in the tank 11 and there will be no danger of the tank becoming empty.

While the booster has been shown applied to a vertically disposed well pipe, it may be applied to a horizontally extending pipe line through which oil or water is conducted and employed as means for creating a good flow of liquid through the pipe line.

Having thus described the invention, what is claimed as new is:

A hydraulic water hoist comprising a vertically disposed pipe line open at its top and bottom and of a length adapting it to have its lower portion immersed in a body of water, said pipe line consisting of a plurality of pipe sections and couplings connecting the same, each coupling being internally thickened to provide a constricted throat tapered towards its upper end and at its upper end surrounded by an annular shoulder concaved transversely, a receptacle disposed in position to be filled by water flowing from the upper end of the pipe line, a pump, a feed pipe for the pump extending from the inlet thereof and into said receptacle, a pipe leading from the outlet of said pump and downwardly at one side of said pipe line and provided with branch pipes extending into the pipe line through openings formed through side portions of said couplings midway upper and lower ends of the throats, and nozzles connected with inner ends of the branch pipes and tapered upwardly and formed with outlet openings at their upper ends for ejecting jets of water upwardly through the upper ends of the throats for urging water in the pipe line upwardly.

GERALD L. CARDINAL.